United States Patent
Zhu et al.

(10) Patent No.: US 11,996,905 B2
(45) Date of Patent: May 28, 2024

(54) COMMUNICATION AND INTERACTION METHOD AND SYSTEM

(71) Applicant: Globe (Jiangsu) Co., Ltd., Changzhou (CN)

(72) Inventors: Yanliang Zhu, Changzhou (CN); Xian Zhuang, Changzhou (CN); Zhengqian Qian, Changzhou (CN); Biao Li, Changzhou (CN); Ming Luo, Changzhou (CN)

(73) Assignee: Globe (Jiangsu) Co., Ltd., Changzhou (CN)

( * ) Notice: Subject to any disclaimer, the term of this patent is extended or adjusted under 35 U.S.C. 154(b) by 263 days.

(21) Appl. No.: 17/504,459

(22) Filed: Oct. 18, 2021

(65) Prior Publication Data

US 2022/0131570 A1 Apr. 28, 2022

(30) Foreign Application Priority Data

Oct. 22, 2020 (CN) .......................... 202011139062.2

(51) Int. Cl.
*H04L 23/02* (2006.01)
*G06F 13/38* (2006.01)
(Continued)

(52) U.S. Cl.
CPC ............. *H04B 3/44* (2013.01); *G06F 13/385* (2013.01); *G06F 13/4282* (2013.01);
(Continued)

(58) Field of Classification Search
CPC ........ H02J 50/10; H02J 50/12; H02J 7/00034; H02J 7/00045; G06F 1/26; G06F 13/385
(Continued)

(56) References Cited

U.S. PATENT DOCUMENTS 9,240,700 B2 1/2016 Terlizzi et al.
2010/0070659 A1* 3/2010 Ma .................... G06F 13/385
710/14

(Continued)

FOREIGN PATENT DOCUMENTS

CN 201681422 U 12/2010
CN 104303388 A 1/2015
(Continued)

*Primary Examiner* — Khai Tran (57) ABSTRACT

The disclosure provides a communication and interaction method and a communication and interaction system using the communication interaction method. The communication and interaction method for communicating and interacting between an electric unit and a power supply unit, including: providing a communication module between the power supply unit and the electric unit; the power supply unit sends a first identification information to the electric unit through the communication module; the electric unit parses the first identification information through the communication module; and the communication module, on the basis of its own communication structure, matches a communication mode and a communication protocol which are applicable to the power supply unit and the electric unit at the same time, such that the communication between the electric unit and the power supply unit is established.

8 Claims, 9 Drawing Sheets

(51) Int. Cl.
   *G06F 13/42*   (2006.01)
   *H04B 3/44*    (2006.01)
   *H04L 12/40*   (2006.01)
   *H04L 69/08*   (2022.01)
   *H04L 69/18*   (2022.01)
   *H04L 69/22*   (2022.01)

(52) U.S. Cl.
   CPC .............. *H04L 12/40* (2013.01); *H04L 69/08* (2013.01); *H04L 69/18* (2013.01); *H04L 69/22* (2013.01); *H04L 2012/40215* (2013.01)

(58) Field of Classification Search
   USPC .......................................... 375/262; 307/104
   See application file for complete search history.

(56) References Cited

U.S. PATENT DOCUMENTS

| | | | | |
|---|---|---|---|---|
| 2011/0302430 | A1* | 12/2011 | Boss | H01R 29/00 |
| | | | | 713/300 |
| 2013/0127256 | A1* | 5/2013 | Kim | H02J 50/10 |
| | | | | 307/104 |
| 2014/0070774 | A1* | 3/2014 | Terlizzi | H02J 7/00 |
| | | | | 320/137 |

FOREIGN PATENT DOCUMENTS

| | | |
|---|---|---|
| CN | 206217652 U | 6/2017 |
| CN | 107425998 A | 12/2017 |
| CN | 108833436 A | 11/2018 |
| CN | 109660483 A | 4/2019 |
| CN | 110402209 A | 11/2019 |
| CN | 110460557 A | 11/2019 |
| CN | 110473307 A | 11/2019 |

* cited by examiner

```
┌─────────────────────────────────────────────┐
│  providing a communication module between the │
│     power supply unit and the electric unit   │
└─────────────────────────────────────────────┘
                      │
                      ▼
┌─────────────────────────────────────────────┐
│  the power supply unit sends a first          │
│  identification information to the electric  │
│  unit through the communication module        │
└─────────────────────────────────────────────┘
                      │
                      ▼
┌─────────────────────────────────────────────┐
│  the electric unit parses the first           │
│  identification information through the       │
│  communication module                         │
└─────────────────────────────────────────────┘
                      │
                      ▼
┌─────────────────────────────────────────────┐
│  the communication module, on the basis of    │
│  its own communication structure, matches a   │
│  communication mode and a communication       │
│  protocol which are applicable to the power   │
│  supply unit and the electric unit at the     │
│  same time, such that the communication       │
│  between the electric unit and the power      │
│  supply unit is established                   │
└─────────────────────────────────────────────┘
```

COMMUNICATION AND INTERACTION METHOD AND SYSTEM

CROSS REFERENCE TO RELATED APPLICATION

The present application is based on, and claims the priority from, Chinese application number CN202011139062.2, filed on Oct. 22, 2020, the disclosure of which is hereby incorporated by reference herein in its entirety for all purposes.

TECHNICAL FIELD

The disclosure relates to a communication and interaction method and a communication and interaction system using the communication and interaction method, and belongs to the technical field of gardening.

BACKGROUND

There is data communication between the battery and the discharging tool, and between the battery and the charger. Due to the limitations of technology, cost and the like, the amount of data capable of being transmitted by the conventional communication mode is small. And the precious resources of the processor can also be seriously occupied during communication. With advances in technology, the user experience needs to be improved, and more and faster data interaction between tool products is needed, but new demands cannot be met due to the defects in the previous generation of communication mode. The new generation of products is then faced with the hard choice of whether to support the old generation products. If a new communication mode is directly adopted, it cannot be compatible with the old products. For example, the new battery communication mode is B, and the old battery communication mode is A, and when the new battery is charged by the old charger or discharged by the matching tool, the valid information cannot be interacted, because the communication modes of the new product and the old product are different, and the information of each other cannot be identified.

Therefore, it is necessary to provide a new communication and interaction method to solve problems mentioned above.

BRIEF DESCRIPTION OF THE DISCLOSURE

The disclosure provides a communication and interaction method and a communication and interaction system using the communication and interaction method. According to the communication and interaction method, a communication module is arranged to use two or more same or different serial communication protocols to establish the communication connection between a power supply unit and an electric unit in the communication and interaction system without changing the communication structure of the power supply unit and the electric unit.

The disclosure provides a communication and interaction method for communicating and interacting between an electric unit and a power supply unit. The method includes: providing a communication module between the power supply unit and the electric unit; the power supply unit sending a first identification information to the electric unit through the communication module; the electric unit parses the first identification information through the communication module; and the communication module, on the basis of its own communication structure, matching a communication mode and a communication protocol which are applicable to the power supply unit and the electric unit at the same time, such that the communication between the electric unit and the power supply unit is established.

As a further improvement of the disclosure, the communication and interaction method further includes replying, by the electric unit, a second identification information to the power supply unit through the communication module according to the first identification information parsed through the communication module, and parsing the second identification information through the communication module.

As a further improvement of the disclosure, the first identification information and the second identification information each include at least two groups of identification bytes, and at least one of the two groups of identification bytes carries communication protocol information for the power supply unit and the electric unit.

As a further improvement of the disclosure, the communication module can match a serial communication protocol and a communication mode which are applicable to the power supply unit and the electric unit simultaneously through the first identification information and the second identification information. And the communication mode at least includes a structure of a communication line which can be communicatively connected with the power supply unit and the electric unit.

As a further improvement of the disclosure, the communication module includes a hardware circuit, a connection terminal, and a power supply line and a communication line which are integrated on the hardware circuit. And the communication line includes one or more of UART, 1-WIRE, CAN, and IIC.

As a further improvement of the present invention, the first identification information includes a first identification byte carrying a model information of the power supply unit and a second identification byte carrying a serial communication protocol of the power supply unit. And the second identification information includes a third identification byte carrying a model information of the electric unit and a fourth identification byte carrying a serial communication protocol of the electric unit.

As a further improvement of the disclosure, when the communication module parses the first identification information sent through the power supply unit, and determines the serial communication protocol adopted by the power supply unit as an old serial communication protocol according to the first identification byte and the second identification byte. The electric unit replies to the power supply unit with the second identification information matched with the first identification information through the communication module according to the first identification information parsed by the communication module. And the communication line corresponding to the old serial communication protocol on the communication module uses the old serial communication protocol to establish communication between the electric unit and the power supply unit.

As a further improvement of the disclosure, the communication module parses the first identification information sent through the power supply unit, and determines the serial communication protocol adopted by the power supply unit as a new serial communication protocol according to the second identification byte. Then the electric unit replies the second identification information to the power supply unit through the communication module. When the communication module determines the serial communication protocol adopted by the electric unit as an old serial communication protocol according to the second identification information, the power supply unit matches the old serial communication protocol and the communication line corresponding to the old serial communication protocol which are applicable to the power supply unit and the electric unit, such that communication between the electric unit and the power supply unit is established.

As a further improvement of the disclosure, when the communication module parses the first identification information sent by the power supply unit, and determines the serial communication protocol adopted by the power supply unit as an old serial communication protocol or a new serial communication mode according to the first identification byte and the second identification byte, the electric unit replies to the power supply unit with the second identification information through the communication module according to the first identification information parsed through the communication module, then the communication module determines that the electric unit and the power supply unit adopt a same serial communication protocol according to the second identification information, and communication between the electric unit and the power supply unit is established via a communication line corresponding to the serial communication protocol adopted by the power supply unit.

The disclosure also provides a communication and interaction system. The communication and interaction system includes a power supply unit, an electric unit, and a communication module for communicatively connecting the power supply unit and the electric unit. Wherein the communication module includes a hardware circuit, a connection terminal, and a power supply line and a communication line which are integrated on the hardware circuit. And the communication module, on the basis of its own communication structure, matches a communication mode and a communication protocol which are applicable to the power supply unit and the electric unit at the same time, such that the communication between the electric unit and the power supply unit is established. And the communication and interaction system can also be used for executing the communication and interaction method.

The disclosure has the beneficial effects that: the communication module determines the serial communication protocol and the communication mode of the power supply unit and the electric unit. Without changing the communication structures of the power supply unit, the electric unit and the communication module, the communication connection between the power supply unit and the electric unit can be realized by using two different serial communication protocols and communication modes. Meanwhile, the communication and interaction system using the communication and interaction method can be compatible with the power supply unit and the electric unit which are of different generations, and can effectively prolong the use time and application range of the power supply unit and the electric unit.

DETAILED DESCRIPTION

To make the objects, technical solutions and advantages of the disclosure clearer, the drawings and specific embodiments will be combined to describe the disclosure in detail.

It should be noted that, to avoid obscuring the disclosure due to unnecessary details, the drawings only show structures and/or processing steps that are closely related to the disclosure, and other details that have little relation to the disclosure are omitted.

In addition, it should further be noted that the terms 'include', 'including', or any other variation thereof, are intended to cover a non-exclusive inclusion, such that a process, method, article, or device that includes a series of elements not only includes those elements but also includes other elements not expressly listed, or includes inherent elements of the process, method, article, or device.

Figure 1:
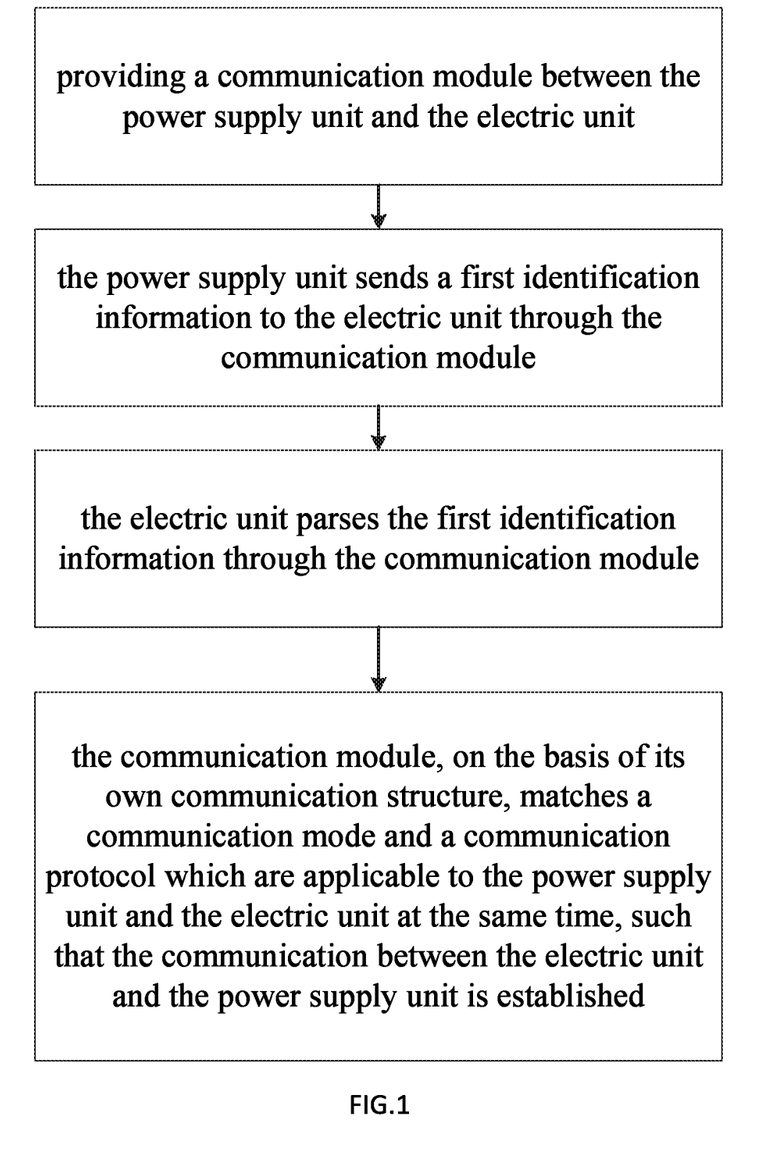
FIG. 1 is a schematic flow diagram of a communication and interaction method of the disclosure.
Figure 2:
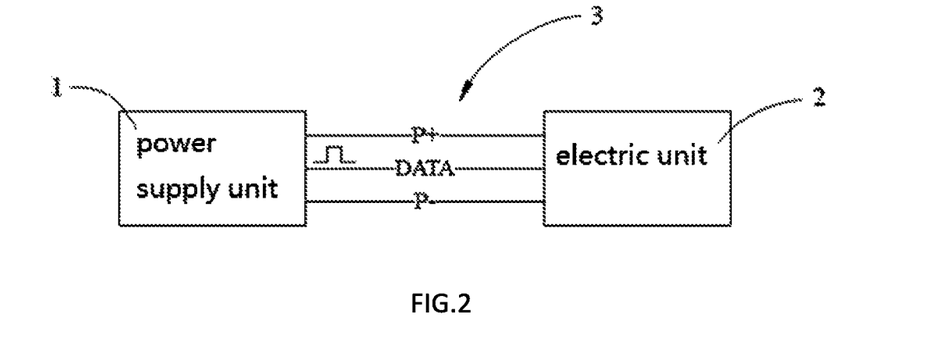
FIG. 2 is a block diagram of a communication and interaction system of the disclosure.

Please referring to FIG. 1 and FIG. 2, the disclosure provides a communication and interaction method for communicating and interacting between the electric unit 2 and the power supply unit 1. Specifically, the communication and interaction method includes:

providing a communication module 3 between the power supply unit 1 and the electric unit 2;

sending, by the power supply unit 1, a first identification information to the electric unit 2 through the communication module 3;

parsing, by the electric unit 2, the first identification information through the communication module 3; and matching and calling, by the communication module 3, a communication mode and a communication protocol which are simultaneously applicable to the power supply unit 1 and the electric unit 2 on the basis of a communication structure of the communication module 3, such that the communication between the electric unit 2 and the power supply unit 1 is established.

The communication and interaction method further includes replying, by the electric unit 2, a second identification information to the power supply unit 1 through the communication module 3 according to the first identification information parsed through the communication module 3, and parsing the second identification information through the communication module 3.

It should be noted that the communication structure in the disclosure refers that the power supply unit 1, the electric unit 2, and the communication module 3 have a serial communication protocol and a communication mode for interaction and communication. And in the disclosure, the communication mode includes, but not be limited to, the structure and number of the communication lines.

Further, the power supply unit 1 and the electric unit 2 are the power supply appliance and the electric appliance which are arranged relatively. In particular, in the field of garden machinery, if the power supply unit 1 is a battery pack, the electric unit 2 can be a garden tool powered by the battery pack to work, such as a mower, a snow thrower, a chain saw, or the like. And when the power supply unit 1 is a charger, the electric unit 2 may be a rechargeable battery pack or a rechargeable garden tool. Namely, in the disclosure, the specific models of the power supply unit 1 and the electric unit 2 in the communication and interaction system 200 can be selected according to actual needs, and is not limited thereto.

In particular, the communication and interaction method of the disclosure is mainly applied to the initial phase of the communication establishment between the power supply unit 1 and the electric unit 2. Namely, in the initial phase of the communication establishment, the communication request is initiated by at least one of the power supply unit 1 and the electric unit 2 (in the disclosure, taking the power supply unit 1 which initiates the request as an example), the other (in the disclosure, taking the electric unit 2 as an example) sends the corresponding communication information to reply after receiving the parsed data. Finally the power supply unit 1 continues to send the next frame of data, and the communication between the power supply unit 1 and the electric unit 2 is established.

Further, the communication module 3 is configured to provide a communication interface between the power supply unit 1 and the electric unit 2. And the communication module 3 includes a hardware circuit, a connection terminal, and a power supply line and a communication line which are integrated on the hardware circuit. Moreover, a plurality of serial communication protocols and communication modes are integrated on the communication module 3, such that the communication module 3 can match and call the serial communication protocol and the communication mode which are applicable to the power supply unit 1 and the electric unit 2 on the basis of the communication structure of the communication module 3 to establish communication between the power supply unit 1 and the electric unit 2.

Specifically, the power supply unit 1 sends the first identification information to the electric unit 2 through the communication module 3, and the electric unit 2 obtains the first identification information through the communication module 3 and transmits the second identification information to the power supply unit 1. Wherein the communication module 3 can also simultaneously or separately parse the first identification information and the second identification information. And in the disclosure the first identification information and the second identification each includes at least two groups of identification bytes. At least one of the two groups of identification bytes carries a serial communication protocol information of the power supply unit and the electric unit.

In one embodiment of the disclosure, the first identification information includes a first identification byte carrying a model information of the power supply unit 1 and a second identification byte carrying a serial communication protocol information of the power supply unit 1. And the second identification information includes a third identification byte carrying the model information of the electric unit 2 and a fourth identification byte carrying a serial communication protocol information of the electric unit 2. Thus, the information content carried by the first identification information and the second identification information can be simplified, in the mean time, it is convenient for the communication module 3 to identify and match the models and the serial communication protocols of the power supply unit 1 and the electric unit 2, and the accuracy and stability of the information identification of the communication module 3 can be ensured.

Further, the communication module 3 can also match with the communication mode simultaneously applicable to the power supply unit 1 and the electric unit 2 through the first identification information and the second identification information. In the disclosure, the communication mode is influenced by the model of the power supply unit 1 and the electric unit 2, and the communication mode at least includes the structure of the communication line of the power supply unit 1 and the electric unit 2.

In a preferable embodiment of the disclosure, the communication module 3 includes a positive electrode (P+) of the power supply, a negative electrode (P−) of the power supply, and a communication line (Data) which are used for connecting the power supply unit 1 with the electric unit 2. Wherein, the communication line is arranged with one as an example, in fact, since there may be a difference between model of the power supply unit 1 and the model of the electric unit 2, the communication mode between the two may be different, namely, the number of communication lines may be arranged to be different. Therefore, the number of communication lines of the power supply unit 1 and the electric unit 2 may be different. When there is a difference in the number of communication lines between the power supply unit 1 and the electric unit 2, the communication module 3 may call a communication mode that matches the power supply unit 1 and the electric unit 2 at the same time, and the hardware circuit and the connection terminal of the communication module 3 do not change accordingly.

Preferably, a communication mode for establishing a communication channel between the power supply unit 1 and the electric unit 2 includes one or more of UART, 1-Wire, CAN, IIC data bus, and the like. In the disclosure, the communication module 3 can select a communication line matched with the serial communication protocol as the communication mode between the power supply unit 1 and the electric unit 2 on the basis of parsing and selecting a corresponding serial communication protocol, thereby the communication stability between the power supply unit 1 and the electric unit 2 can be ensured.

In the following description, the example is that the first identification information includes a first identification byte carrying a model information of the power supply unit 1 and a second identification byte carrying a serial communication protocol of the power supply unit 1, and the second identification information includes a third identification byte carrying a model information of the electric unit 2 and a fourth identification byte carrying the serial communication protocol of the electric unit 2. And the communication and interaction method of the disclosure will be described in detail with reference to specific embodiments.

Embodiment One

Figure 3:
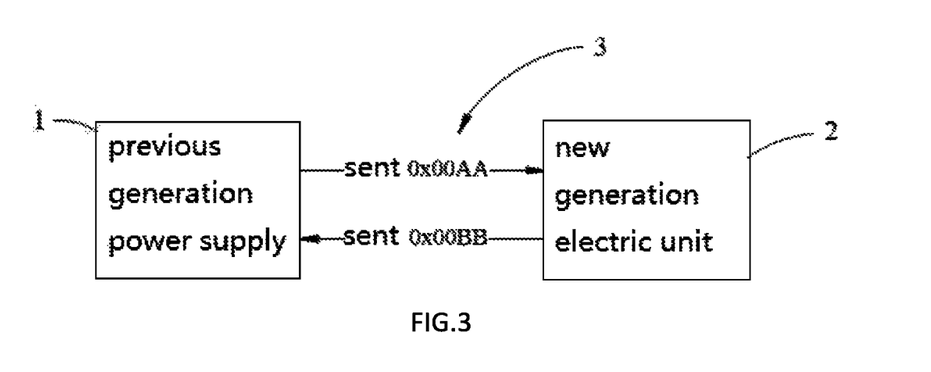
FIG. 3 is a schematic diagram of a communication between a power supply unit and an electric unit in the embodiment one of the disclosure.
Figure 4:
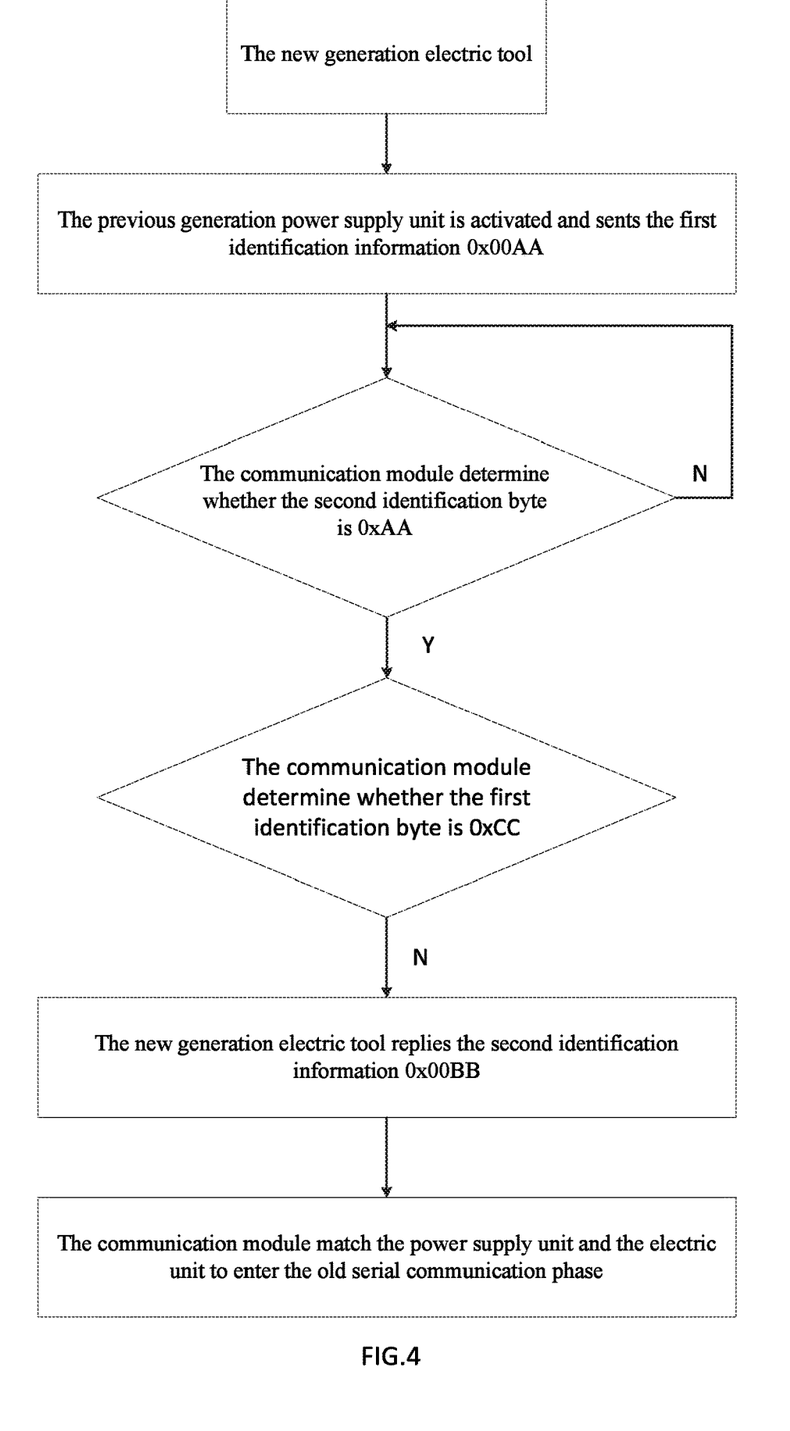
FIG. 4 is a flow chart of a communication between the power supply unit and the electric unit in the embodiment one of the disclosure.

Referring to FIG. 3 and FIG. 4, in the present embodiment, the power supply unit 1 is a previous generation power supply unit adopting an old serial communication mode, and the electric unit 2 is a new generation electric unit adopting a new serial communication mode.

Further, the communication module 3 is integrated in the electric unit 2 and can receive and parse the first identification information sent by the power supply unit 1 to assist the electrical unit 2 in matching the serial communication protocol and the communication mode which are applicable to the power supply tool 1, without changing the structure of the electric unit 2 and the communication module 3.

In the present embodiment, when starting the electric unit 2, the electric unit 2 and the communication module 3 are powered on, the power supply unit 1 is electrically connected to the electric unit 2 through the communication module 3, and the power supply unit 1 is activated. Then the power supply unit 1 sends the first identification information 0x00AA, and the communication module 3 parses whether the second identification byte carried in the first identification information 0x00AA is 0xAA. If the second identification byte is 0xAA, the communication module 3 parses whether the first identification byte carried in the first identification information 0x00AA is 0xCC. And if the second identification byte is not 0xCC, the power supply unit 1 is determined to be the previous generation power supply unit that use the old serial communication protocol.

Further, the electric unit 2 replies the second identification information 0x00BB matched with the first identification information 0x00AA through the communication module 3 according to the first identification information 0x00AA parsed by the communication module 3, and matches with the old serial communication protocol and the communication line conforming to the previous generation power supply unit via the communication module 3, to further receive the next frame communication data sent by the power supply unit 1 to enter the old serial communication phase to complete the communication establishment between the electric unit 2 and the power supply unit 1.

Embodiment Two

Figure 5:
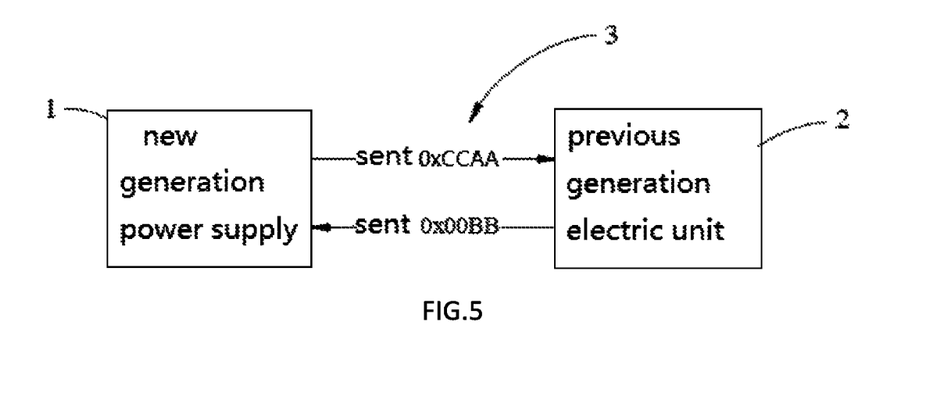
FIG. 5 is a schematic diagram of a communication between a power supply unit and an electric unit in the embodiment two of the disclosure.
Figure 6:
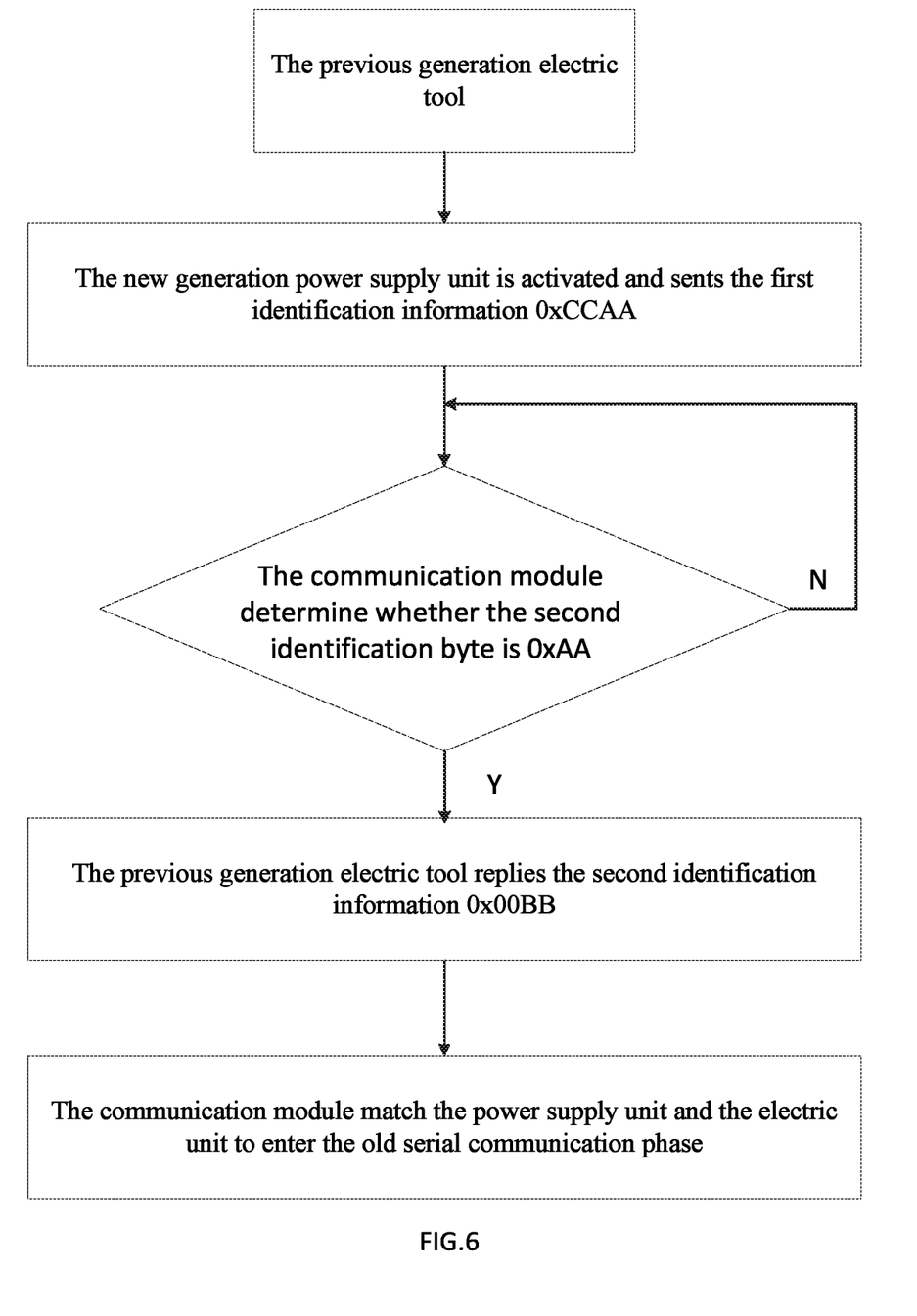
FIG. 6 is a flow chart of a communication between the power supply unit and the electric unit in the embodiment two of the disclosure.

Referring to FIG. 5 and FIG. 6, in the present embodiment, the power supply unit 1 is a new generation power supply unit adopting a new serial communication mode, and the electric unit 2 is the previous generation power unit adopting the old serial communication mode.

Further, the communication module 3 is integrated into the electric unit 2 and can receive and parse the first identification information sent by the power supply unit 1 to assist the power supply unit 1 in matching with the serial communication protocol and the communication mode which are applicable to the electric unit 2, without changing the structure of the electric unit 2 and the communication module 3.

In the present embodiment, when starting the electric unit 2, the electric unit 2 and the communication module 3 are powered on, the power supply unit 1 is electrically connected to the electric unit 2 through the communication module 3, and the power supply unit 1 is activated. Then the power supply unit 1 sends the first identification information 0xCCAA, and the communication module 3 parses whether the second identification byte carried in the first identification information 0x00AA is 0xAA. If the second identification byte is 0xAA, the power supply unit 1 is determined to adopt a new serial communication protocol.

The electric unit 2 replies the second identification information 0x00BB through the communication module 3 and the communication module 3 parses the second identification information 0x00BB. And the electric unit 2 is determined to be a previous generation electric unit 2 adopting the old serial communication protocol. Furthermore, the communication module 3 can also be used for parsing the first identification byte 0xCC and the third identification byte 0x00 to determine the power supply unit 1 as a new generation power supply unit. Since the electric unit 2 is the previous generation electric unit and the new serial communication protocol used by the power supply unit 1 can be downward compatible with the old serial communication protocol used by the electric unit 2, the communication module 3 matches the old serial communication protocol and the communication line conforming to the previous generation electric unit which are applicable to the power supply unit 1 and the electric unit 2, and further receives the next frame communication data sent by the power supply unit 1, then enters the old serial communication phase to complete the communication establishment between the electric unit 2 and the power supply unit 1.

Embodiment Three

Figure 7:
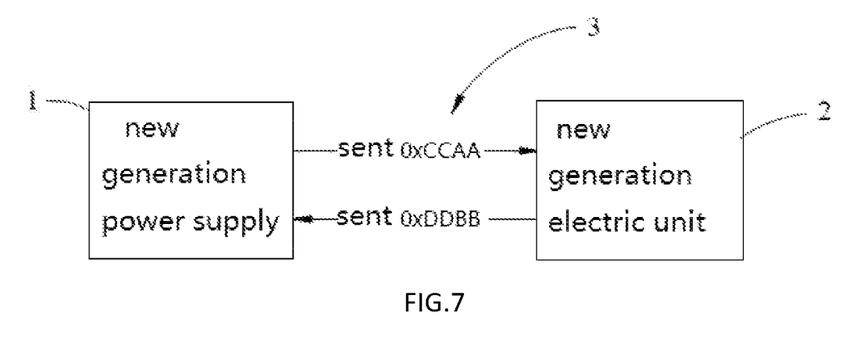
FIG. 7 is a schematic diagram of a communication between a power supply unit and an electric unit in the embodiment three of the disclosure.
Figure 8:
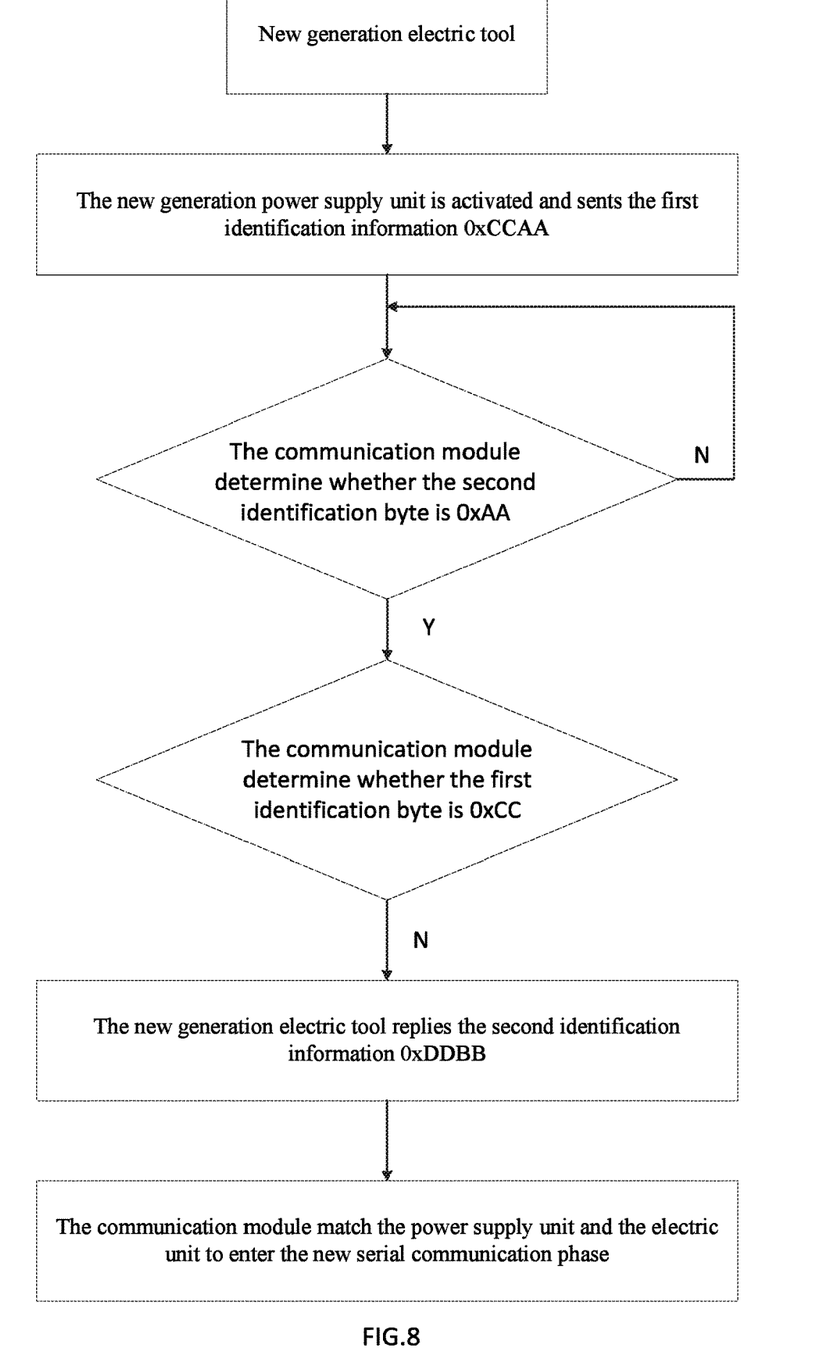
FIG. 8 is a flow chart of a communication between the power supply unit and the electric unit in the embodiment three of the disclosure.

Referring to FIG. 7 and FIG. 8, in the present embodiment, the power supply unit 1 is a new generation power supply unit adopting a new serial communication mode, and the electric unit 2 is a new generation electric unit adopting a new serial communication mode.

Further, the communication module 3 is integrated into the electric unit 2. Under the condition that the structure of the electric unit 2 and the communication module 3 is not changed, the communication module 3 can receive the first identification information sent by the power supply unit 1 and the second identification information sent by the electric unit 2, and can communicatively connect power supply unit 1 with the electric unit 2.

In particular, in this embodiment, when starting the electric unit 2, the electric unit 2 and the communication module 3 are powered on, the power supply unit 1 is electrically connected to the electric unit 2 through the communication module 3, and the power supply unit 1 is activated. Then the power supply unit 1 sends the first identification information 0xCCAA via the communication module 3, and the communication module 3 parses whether the second identification byte carried in the first identification information 0xCCAA is 0xAA. If the second identification byte is 0xAA, the communication module 3 parses whether the first identification byte carried in the first identification information 0xCCAA is 0xCC. And if the second identification byte is 0xCC, the power supply unit 1 is determined to be a new generation power supply unit that use a new serial communication protocol.

Further, the electric unit 2 determines the power supply unit 1 as a new generation power supply unit using a new serial communication protocol according to the first identification information 0xCCAA parsed by the communication module 3; and replies, by the communication module 3, a second identification information 0xDDBB matching with the first identification information 0xCCAA sent by the new generation power supply unit. The communication module 3 can determine both the power supply unit 1 and the electric unit 2 as the new tools adopting the new serial communication protocols. At this moment, the communication module 3 uses the new serial communication protocol to communicatively connect the power supply unit 1 with the electric unit 2 to establish communication between the electric unit 2 and the power supply unit 1.

Embodiment Four

Figure 9:
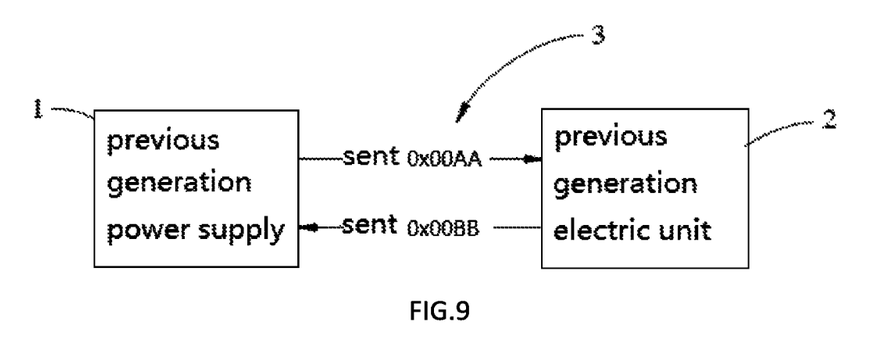
FIG. 9 is a schematic diagram of a communication between a power supply unit and an electric unit in the embodiment four of the disclosure.
Figure 10:
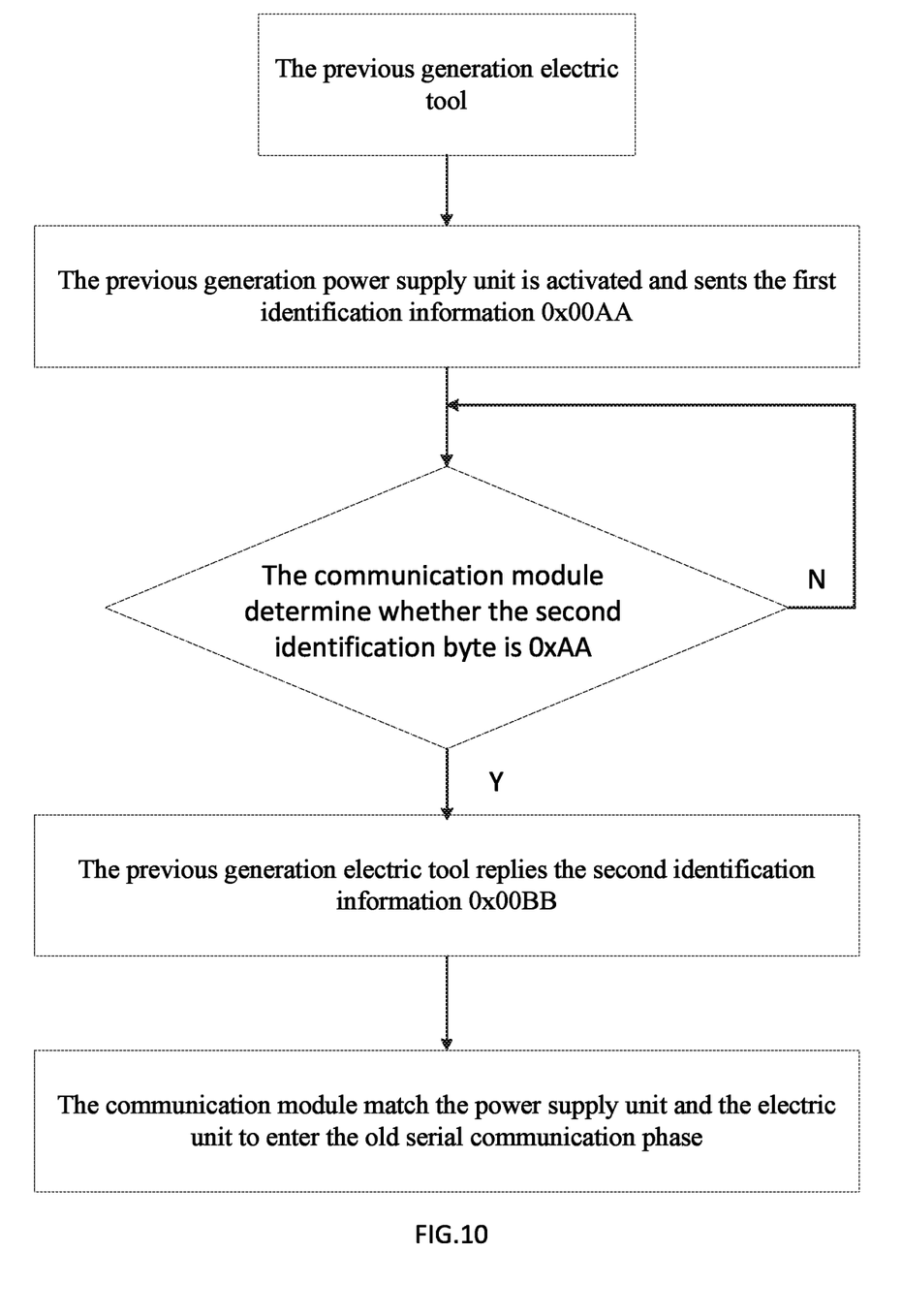
FIG. 10 is a flow chart of a communication between the power supply unit and the electric unit in the embodiment four of the disclosure.

Referring to FIG. 9 and FIG. 10, in the present embodiment, the power supply unit 1 is the previous generation power supply unit adopting the old serial communication mode, and the electric unit 2 is the previous generation electric unit adopting the old serial communication mode.

Further, the communication module 3 is integrated into the electric unit 2. Without changing the structure of the electric unit 2 and the communication module 3, the communication module 3 can receive the first identification information sent by the power supply unit 1 and the second identification information sent by the electric unit 2 to communicatively connect the power supply unit 1 with the electric unit 2.

Specifically, in the present embodiment, when starting the electric unit 2, the electric unit 2 and the communication module 3 are powered on, the power supply unit 1 is electrically connected to the electric unit 2 via the communication module 3, and the power supply unit 1 is activated. Then the power supply unit 1 sends the first identification information 0x00AA via the communication module 3, and the communication module 3 parses whether the second identification byte carried in the first identification information 0x00AA is 0xAA. If the second identification byte is 0xAA, the communication module 3 parses the first identification byte 0x00 to determine the power supply unit 1 to be the previous generation power supply unit that uses the old serial communication protocol.

The electric unit 2 replies the second identification information 0x00BB matching with the first identification information 0x00AA via the communication module 3 according to the first identification information 0x00AA parsed by the communication module 3, to determine the electric unit 2 as the previous generation electric unit adopting the old serial communication protocol. Since the new serial communication protocol used by the power supply unit 1 can be downward compatible with the old serial communication protocol used by the electric unit 2, the communication module 3 matches the old serial communication protocol and the communication line conforming to the previous generation electric unit which are applicable to the power supply unit 1 and the electric unit 2, and further receives the next frame communication data sent by the power supply unit 1, then enters the old serial communication phase to complete the communication establishment between the electric unit 2 and the power supply unit 1.

It should be noted that, in an embodiment of the disclosure, it is taken as an example that only two sets of identifying bytes are present in the first identification information and the second identification information, the first identification byte carries model information for determining the power supply unit 1 or the electric unit 2 and the second identification byte carries a serial communication protocol and corresponding communication mode information for determining the power supply unit 1 and the electric unit 2. In other embodiments of the disclosure, the first identification information and the second identification information may each include a plurality of different sets of identification bytes, and each byte may carry different identification information. Namely, the number of identification bytes contained in the first identification information and the second identification information in the disclosure and the information carried by the identification byte may be selected according to actual needs. The contents of the embodiments are exemplary only, and should not be limited herein.

Referring to FIG. 2, the disclosure also provides a communication and interaction system. The communication and interaction system 200 includes a power supply unit 1, an electric unit 2, and a communication module 3 for communicatively connecting the power supply unit 1 with the electric unit 2. And in the disclosure, the communication module 3 includes a hardware circuit, a connection terminal, and a power supply line and a communication line which are integrated on the hardware circuit. And the communication module can match and call the serial communication protocol applicable to the power supply unit 1 and the electric unit 2 on the basis of the communication structure of the communication module itself. Such that the communication between the electric unit 2 and the power supply unit 1 is established. The communication and interaction system of the disclosure can also be used to perform the aforementioned communication and interaction method.

It should be noted that, in the disclosure, the power supply unit 1 and the electric unit 2 are a power supply appliance and an electric appliance which are arranged relatively. Specifically, in the field of garden machinery, if the power supply unit 1 is a battery pack, the electric unit 2 can be a garden tool powered by the battery pack to work, such as a mower, a snow thrower, a chain saw, and the like. When the power supply unit 1 is a charger, the electric unit 2 may be a rechargeable battery pack or a rechargeable garden tool. Namely, in the disclosure, the specific model of the power supply unit 1 and the electric unit 2 in the communication and interaction system 200 may be selected according to actual needs, but should not be limited herein.

Further, in the embodiment of the disclosure, the communication module 3 is arranged on the electric unit 2 as an example. In fact, in other embodiments of the disclosure, the communication module 3 may also be provided on the power supply unit 1 or present as a separate component. Namely, the specific position and form of the communication module 3 in the disclosure may be selected according to actual needs, but should not be limited herein.

In summary, the communication and interaction method of the disclosure determines the serial communication protocol and communication mode of the power supply unit 1 and the electric unit 2 through the communication module 3. Without changing the structures of the power supply unit 1, the electric unit 2, and the communication module 3, the communication connection between the power supply unit 1 and the electric unit 2 using two different serial communication protocols and communication modes is realized. Meanwhile, the communication and interaction system using the communication and interaction method can ensure the communication compatibility between the power supply unit 1 and the electric unit 2 of different generations, and can effectively improve the working time and the application range of the power supply unit 1 and the electric unit 2.

The above embodiments is only used to illustrate the technical proposal of the disclosure, but not limited thereto. Although the disclosure has been described in detail with reference to preferable embodiments, it will be understood by those skilled in the field, and can be modified or replaced with equivalents without departing from the spirit and scope of the technical solutions of the disclosure.

What is claimed is:

1. A communication and interaction method for communicating and interacting between an electric unit and a power supply unit, comprising:

providing a communication module between the power supply unit and the electric unit;

sending, by the power supply unit, a first identification information to the electric unit through the communication module;

parsing, by the electric unit, the first identification information through the communication module;

replying, by the electric unit, a second identification information to the power supply unit through the communication module according to the first identification information parsed through the communication module, and parsing the second identification information through the communication module; and matching, by the communication module, a communication mode and a communication protocol which are applicable to the power supply unit and the electric unit at the same time on the basis of a communication structure of the communication module, such that communication between the electric unit and the power supply unit is established;

wherein the first identification information and the second identification information each comprise at least two groups of identification bytes, and at least one of the two groups of identification bytes carries communication protocol information for the power supply unit and the electric unit.

2. The communication and interaction method of claim 1, wherein
the communication module is capable of matching a serial communication protocol and a communication mode which are applicable to the power supply unit and the electric unit simultaneously through the first identification information and the second identification information, and the communication mode at least comprises a structure of a communication line which is capable of being communicatively connected with the power supply unit and the electric unit.

3. The communication and interaction method of claim 2, wherein
the communication module comprises a hardware circuit, a connection terminal, and a power supply line and a communication line which are integrated on the hardware circuit; and the communication line comprises one or more of UART, 1-WIRE, CAN, and IIC.

4. The communication and interaction method of claim 1, wherein
the first identification information comprises
a first identification byte, carrying a model information of the power supply unit, and
a second identification byte, carrying a serial communication protocol of the power supply unit; and
the second identification information comprises
a third identification byte, carrying a model information of the electric unit, and
a fourth identification byte, carrying a serial communication protocol of the electric unit.

5. The communication and interaction method of claim 4, wherein
when the communication module parses the first identification information sent through the power supply unit, and determines the serial communication protocol adopted by the power supply unit as an old serial communication protocol according to the first identification byte and the second identification byte, the electric unit replies to the power supply unit with the second identification information matched with the first identification information through the communication module according to the first identification information parsed by the communication module, and the communication line corresponding to the old serial communication protocol on the communication module uses the old serial communication protocol to establish communication between the electric unit and the power supply unit.

6. The communication and interaction method of claim 4, wherein
the communication module parses the first identification information sent through the power supply unit, and determines the serial communication protocol adopted by the power supply unit as a new serial communication protocol according to the second identification byte, then the electric unit replies the second identification information to the power supply unit through the communication module, when the communication module determines the serial communication protocol adopted by the electric unit as an old serial communication protocol according to the second identification information, the power supply unit matches the old serial communication protocol and the communication line corresponding to the old serial communication protocol which are applicable to the power supply unit and the electric unit, such that communication between the electric unit and the power supply unit is established.

7. The communication and interaction method of claim 4, wherein
when the communication module parses the first identification information sent by the power supply unit, and determines the serial communication protocol adopted by the power supply unit as an old serial communication protocol or a new serial communication mode according to the first identification byte and the second identification byte, the electric unit replies to the power supply unit with the second identification information through the communication module according to the first identification information parsed through the communication module, then the communication module determines that the electric unit and the power supply unit adopt a same serial communication protocol according to the second identification information, and communication between the electric unit and the power supply unit is established via a communication line corresponding to the serial communication protocol adopted by the power supply unit.

8. A communication and interaction system, comprising:
a power supply unit,
an electric unit, and
a communication module for communicatively connecting the power supply unit and the electric unit; the communication module comprising:
a hardware circuit,
a connection terminal,
a power supply line, and
a communication line, the power supply line and the communication line being integrated on the hardware circuit;
wherein the communication module, on the basis of a communication structure the communication module, matches a communication mode and a communication protocol which are applicable to the power supply unit and the electric unit at the same time, such that communication between the electric unit and the power supply unit is established; and the communication and interaction system also is capable of being used for executing the communication and interaction method of claim 1.

* * * * *